(12) United States Patent
Nakano (10) Patent No.: US 8,557,157 B2
(45) Date of Patent: Oct. 15, 2013

(54) METHOD OF MANUFACTURING AN ARTICLE OF FOOTWEAR HAVING A DIRECT ATTACH SOLE COMPONENT

(75) Inventor: Kiyotaka Nakano, Rockford, MI (US)

(73) Assignee: Wolverine World Wide, Inc., Rockford, MI (US)

( * ) Notice: Subject to any disclaimer, the term of this patent is extended or adjusted under 35 U.S.C. 154(b) by 748 days.

(21) Appl. No.: 12/496,177

(22) Filed: Jul. 1, 2009

(65) Prior Publication Data

US 2011/0000101 A1    Jan. 6, 2011

(51) Int. Cl.
B29C 45/14    (2006.01)

(52) U.S. Cl.
USPC ............................ 264/244; 264/263; 264/275

(58) Field of Classification Search
None
See application file for complete search history.

(56) References Cited

U.S. PATENT DOCUMENTS

| | | | | |
|---|---|---|---|---|
| 2,202,750 | A * | 5/1940 | Andia | 425/119 |
| 3,109,701 | A * | 11/1963 | Jacquet | 264/244 |
| 3,305,895 | A * | 2/1967 | Ludwig | 425/119 |
| 3,377,723 | A | 4/1968 | England | |
| 3,659,301 | A * | 5/1972 | Auberry et al. | 12/133 R |
| 3,913,160 | A * | 10/1975 | Funck | 12/142 R |
| D268,303 | S | 3/1983 | Gaski | |
| D287,902 | S | 1/1987 | Forsyth | |
| D305,954 | S | 2/1990 | Kin | |
| 5,086,574 | A | 2/1992 | Bacchiocchi | |
| 5,174,049 | A | 12/1992 | Flemming | |
| 5,667,738 | A * | 9/1997 | Krajcir | 264/45.5 |
| 5,669,161 | A | 9/1997 | Huang | |
| 5,784,811 | A | 7/1998 | Mauch | |
| 5,787,609 | A * | 8/1998 | Wu | 36/28 |
| 5,864,969 | A | 2/1999 | Mauch | |
| 5,885,500 | A * | 3/1999 | Tawney et al. | 264/154 |
| 5,918,384 | A | 7/1999 | Meschan | |
| D423,766 | S | 5/2000 | Genga | |
| 6,205,684 | B1 | 3/2001 | Snyder | |
| 6,560,901 | B1 * | 5/2003 | Oberg et al. | 36/30 R |
| 6,564,476 | B1 * | 5/2003 | Hernandez | 36/28 |
| 6,807,753 | B2 | 10/2004 | Steszyn et al. | |
| 6,966,130 | B2 | 11/2005 | Meschan | |
| 6,983,553 | B2 | 1/2006 | Lussier et al. | |
| 7,048,881 | B2 * | 5/2006 | Otis et al. | 264/132 |

(Continued)

FOREIGN PATENT DOCUMENTS

| | | |
|---|---|---|
| CN | 1895117 | 1/2007 |
| EP | 1362522 | 11/2003 |

(Continued)

Primary Examiner — Edmund H. Lee
(74) Attorney, Agent, or Firm — Warner Norcross & Judd LLP (57) ABSTRACT

A method of manufacturing an article of footwear having a direct attach sole component includes providing an upper and a receptacle shell that defines a receptacle adapted to receive a cushion insert. A molding insert is placed into the receptacle, and the upper is joined with the receptacle shell. A mold is closed about the receptacle shell and at least a portion of the upper to form a mold cavity corresponding to the direct attach sole component. Material is introduced into the mold cavity to form the direct attach sole component. The mold insert protects the shell from deformation during the molding process. The mold insert is removed and replaced with a cushioning insert after the molding process. The footwear can optionally include a partially transparent shell that supports a sole component that receives a cushion insert, such that the cushion insert and/or sole component are visible through the shell.

6 Claims, 7 Drawing Sheets

(56) References Cited

U.S. PATENT DOCUMENTS

| | | |
|---|---|---|
| D555,341 S | 11/2007 | Vasyli et al. |
| D594,200 S | 6/2009 | Nakano |
| 7,730,635 B2 | 6/2010 | Aveni et al. |
| 7,743,530 B2 * | 6/2010 | Truelsen ............... 36/30 R |
| 7,757,410 B2 | 7/2010 | Aveni et al. |
| 7,950,167 B2 * | 5/2011 | Nakano ............... 36/28 |
| 7,950,168 B2 * | 5/2011 | Nakano ............... 36/28 |
| 2006/0130365 A1 | 6/2006 | Sokolowski et al. |
| 2006/0283046 A1 | 12/2006 | Mason |
| 2008/0016718 A1 | 1/2008 | Aveni et al. |
| 2008/0289218 A1 | 11/2008 | Nakano |
| 2008/0289219 A1 | 11/2008 | Nakano |
| 2010/0192407 A1 | 8/2010 | Aveni et al. |

FOREIGN PATENT DOCUMENTS

| | | |
|---|---|---|
| EP | 1733636 | 12/2006 |
| WO | 90/00866 | 2/1990 |
| WO | 2005/053451 | 6/2005 |
| WO | WO 2005053451 * | 6/2005 |
| WO | 2006/057978 | 6/2006 |

* cited by examiner

METHOD OF MANUFACTURING AN ARTICLE OF FOOTWEAR HAVING A DIRECT ATTACH SOLE COMPONENT

BACKGROUND OF THE INVENTION

The present invention relates to footwear and, more particularly, to an adjustable footwear sole construction and method for making the same.

The design and manufacture of footwear is complicated by the fact that different people have different footwear needs. For example, some individuals prefer a firmer, more unyielding sole, while others prefer a softer, more cushioning sole. With some people this is simply an aesthetic desire, but for others it can result from physical factors, such as those associated with foot shape, skeletal alignment and other anatomical issues. Anatomical issues cause some individuals to suffer from a tendency to pronate (roll their feet inward when striding) and others to have the opposite tendency to supinate (roll their feet outward when striding). One method for addressing these issues is to stiffen the sole in select regions to provide increased resistance against the undesired motion. For example, pronation can be addressed by providing a dual-density midsole with a higher density region along the medial side of the sole. Similarly, supination can be addressed by providing a dual-density midsole with a higher density region along the lateral side of the sole.

In an effort to address the needs of different consumers, a variety of footwear products have been developed with a customizable sole construction. For example, in some products, the sole defines a void or receptacle adapted to receive one of a variety of different cushioning inserts, or a single insert having differing cushioning characteristics depending on the position of the insert in the receptacle. The wearer customizes the sole based on the wearer's individual cushioning and support needs by either inserting the appropriate cushioning insert into the receptacle or rotating the single insert to the desired position. A type of cushioning insert configuration is described in U.S. Patent Publication 2008/0289219, which is hereby incorporated herein by reference in its entirety.

There is also an ongoing effort in the footwear industry to produce footwear that provides both durability and flexibility. Many conventional footwear constructions, however, focus on either durability or flexibility—but usually not both—because the features providing these characteristics typically compete against one another. One construction that is known for flexibility is a direct attach construction, which can include a flexible polyurethane midsole that is direct attached to an upper. The direct attach construction also provides a secure connection between the midsole and the upper and eliminates the need for cement or a welt. One typical method for manufacturing a direct attach construction includes arranging the upper over a last and adding a sole board adjacent a bottom surface of the last to provide a molding surface. The assembly is then placed in a mold so that the midsole material can be molded in place directly onto the sole board and upper.

While the customizable sole and the direct attach constructions are both desirable, it is difficult to combine the two constructions in one piece of footwear.

SUMMARY OF THE INVENTION

One aspect of the present invention provides a method of manufacturing an article of footwear including the steps of joining a receptacle shell with an upper, filling the shell with a molding insert and molding a sole component directly to the shell.

According to one embodiment, a method of manufacturing an article of footwear having a direct attach sole component includes: (a) providing an upper and a receptacle shell that forms a receptacle adapted to receive an insert; (b) placing a molding insert into the receptacle; (c) arranging the upper about a last adapted to engage the receptacle shell and joining the upper with the receptacle shell; (d) closing a mold about the receptacle shell and at least a portion of the upper to form a mold cavity corresponding to the direct attach sole component; and (e) introducing a material into the mold cavity to form the direct attach sole component.

Optionally, the receptacle shell can have a contoured interface surface that directly corresponds with an interface surface on the molding insert. The molding insert can be formed from a relatively hard material that maintains the shape of the receptacle shell when the material is introduced into the mold cavity. After the direct attach sole component is formed, the molding insert can be removed and replaced with a cushion insert, which can be formed from a softer material than that used to form the molding insert.

According to another embodiment, the method includes arranging an upper about a last that has at least one projection that corresponds to the shape of the receptacle in the receptacle shell. The projection can be adapted to interfit with the receptacle, such that a separate molding insert is not required.

According to yet another embodiment, the mold can include at least one protrusion, and the method can include engaging the receptacle shell with the protrusion while the material is introduced into the mold cavity to prevent the material from engaging the receptacle shell in select locations. When the protrusions are separated from the direct attach sole component, windows or openings are left in the sole component.

Another aspect of the invention provides a shell that includes a transparent portion, such that portions of an edge of a cushion insert and/or a sole component adapted to support the cushion insert are viewable from an exterior of the footwear article.

According to one embodiment, a footwear article includes a shell adapted to receive a sole component adapted receive a cushion insert. The cushion insert has a contoured interface surface that engages at least a portion of a contoured interface surface on the sole component. The interface surfaces of both the cushion insert and the sole component have an edge, at least one of which is viewable through a transparent portion of the shell. The footwear construction also includes an outsole joined with at least a portion of the shell, such that the transparent portion of the shell is viewable from the exterior of the footwear construction. An upper is attached to the shell, the sole component and/or the outsole.

Optionally, the outsole can define at least one window. Portions of the edge of the cushion insert interface surface and/or the sole component interface surface can be viewable through the window. The shell can include a floor adapted to support the sole component and at least one sidewall. The sidewall can optionally be the transparent portion of the shell and can be aligned with the window in the outsole.

Thus, one aspect of the invention provides a method of manufacturing a footwear article that allows a sole component to be directly attached to the article and formed in a shape that is adapted to receive an insert. In an embodiment in which the direct attach sole component attaches to a receptacle shell, a molding insert maintains the general contour of the shell and, therefore, the contour of the direct attach sole component. The molding insert can prevent the shell from being deformed by the high temperature and pressure encountered during molding of the sole component. Another aspect of the present invention provides a shell having a transparent portion that allows a sole component and/or cushion insert to be covered and viewable from an exterior of a footwear article. The transparent shell can prevent dirt or other debris from entering the footwear article through a window or other opening.

These and other objects, advantages, and features of the invention will be more fully understood and appreciated by reference to the description of the current embodiment and the drawings.

DESCRIPTION OF THE CURRENT EMBODIMENT

A footwear construction or article in accordance with an embodiment of the present invention is shown in FIGS. 1-7C and is generally designated 10. In the illustrated embodiment, the footwear article 10 generally includes an upper 12, a receptacle shell 18, a cushion insert 20 and a direct attach sole component 22. A receptacle 24 adapted to receive the cushion insert 20 is formed in the top surface 27 of the receptacle shell 18. The footwear article 10 can be manufactured by arranging the upper 12 over a last 114 and placing a molding insert 112 into the receptacle 24 (FIG. 7B). The upper 12 is joined with the receptacle shell 18, with a first or top surface 27 of the receptacle shell 18 facing the last and the upper. A mold 100 is closed about at least a portion of the upper 12 and the receptacle shell 18 to form a mold cavity 110 that corresponds to the direct attach sole component 22. A material is introduced into the mold cavity 110 to form the direct attach sole component 22, such that the material forms a direct attach bond with at least a portion of the upper and with the bottom surface 26 of the receptacle shell 18. The mold 100 and last 114 can then be separated from the upper 12, receptacle shell 18 and direct attach sole component 22, thus forming the footwear article 10. The molding insert 112 can then be removed and replaced by the cushion insert 20.

I. Construction

For purposes of this disclosure, the embodiments are described in connection with a shoe; however, the method is well-suited for manufacturing other types of soled footwear. Further, as used herein, the term "arch region" (or arch portion) refers generally to the portion of the shoe corresponding to the arch of the wearer's foot; the term "forefoot region" refers generally to the portion of the shoe forward of the arch region corresponding to the forefoot (e.g., the ball and the toes) of a wearer's foot; and the term "heel region" refers generally to that portion of the shoe rearward of the arch region corresponding to the heel of the wearer's foot. The forefoot region 34, arch region 36 and heel region 38 are generally identified in FIG. 2; however, it is to be understood that delineation of these regions may vary depending upon the configuration of the footwear.

Figure 1:
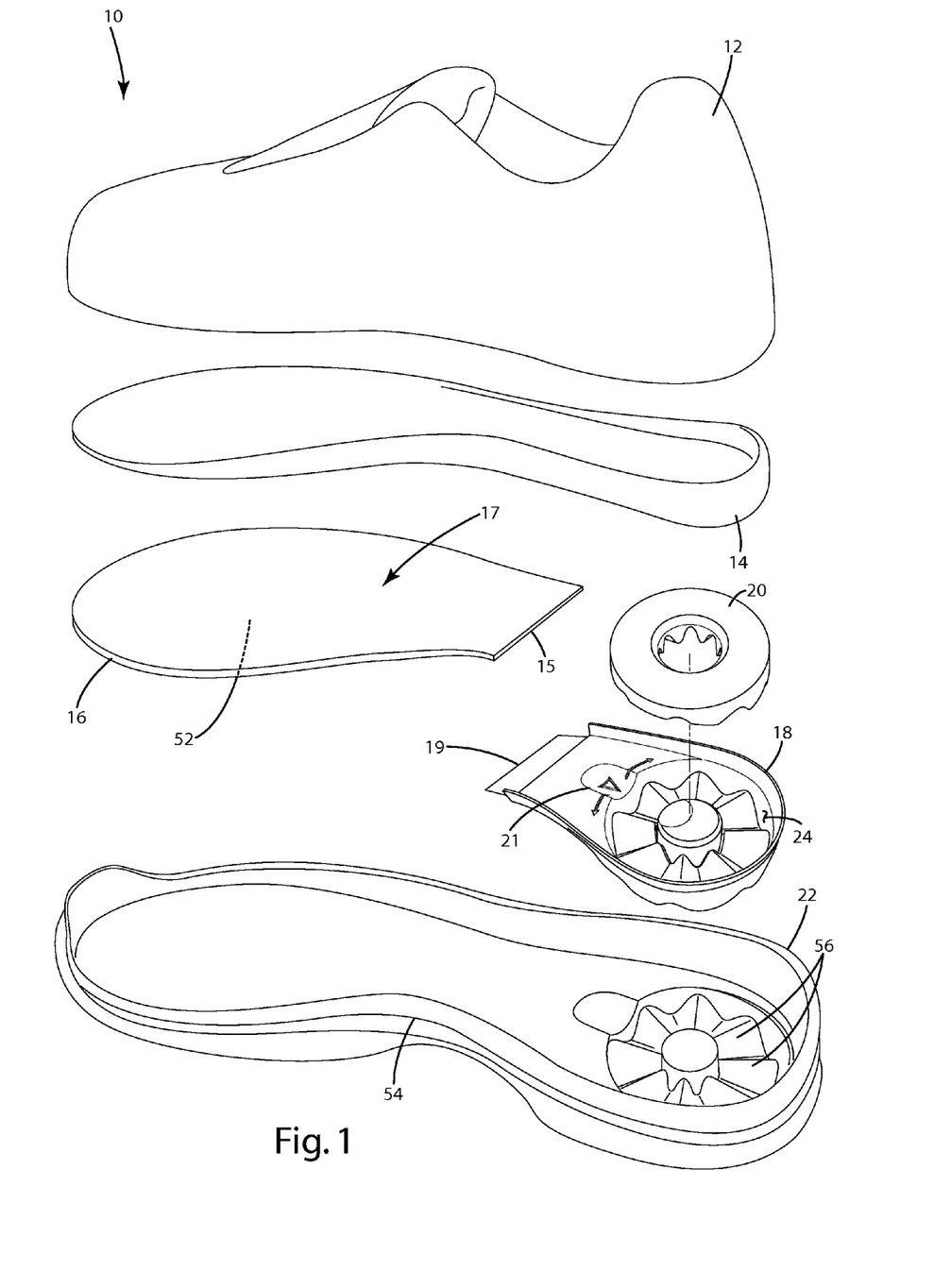
FIG. 1 is an exploded view of a footwear construction in accordance with the present invention.
Figure 2:
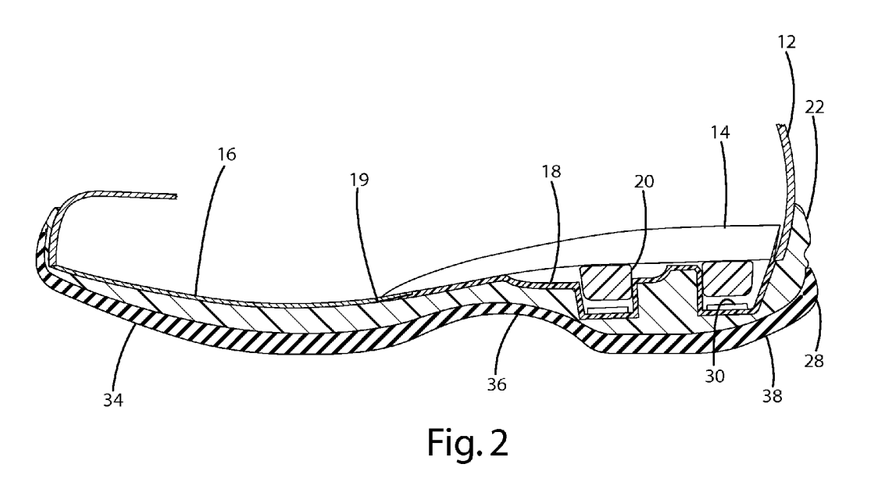
FIG. 2 is a sectional side view of the footwear construction.

The upper 12 is generally conventional and will not be described in detail. As shown in FIGS. 1 and 2, the upper 12 is adapted to be secured to at least one other component to cooperatively define a foot-containing envelope. The upper 20 may be manufactured from leather, canvas, nylon, or other suitable materials and may include a liner (not shown) or other conventional accessories. Although not shown, the upper 12 can include multiple elements, such as a vamp, quarters and a back stay. If included, these pieces of the upper may be fitted and sewn together using conventional techniques and apparatus. The construction of the upper 12 can vary depending on the type of footwear article 10.

In the illustrated embodiment, the sole board 16 extends through the forefoot and arch regions 36 and 38 of the article 10 and is adapted to overlap and/or be joined with the receptacle shell 18 (discussed below), so that the direct attach sole component 22 has a full-length surface to which it can attach. The sole board 16 can be constructed from a variety of conventional materials and can be generally flat and flexible. The sole board 16 can be cemented, stitched, stapled or otherwise fastened to the upper 12 and the receptacle shell 18.

The receptacle shell 18 can be formed in any size and shape suitable to join with the sole board 16 to provide a full-length surface to which the sole component 22 can attach. In the illustrated embodiment, the receptacle shell 18 is a partial-length shell that is positioned in the heel region 38 of the footwear article 10 (FIGS. 1-4). However, in other embodiments, the receptacle shell 18 can be a full-length shell that follows the general shape of a footwear article 10, such that a sole board 16 is not required. As shown in FIG. 2, the edge 19 of the receptacle shell 18 is adapted to overlap and be joined with an adjacent edge 15 of the sole board 16. In the illustrated embodiment shown in FIG. 1, the edge 19 of the receptacle shell 18 and the edge 15 of the sole board 16 are both relatively thinner than the remaining portions of the respective receptacle shell 18 and sole board 16, such that the thickness of these components remains relatively the same across the length of the footwear article 10, despite the region of overlap. The edge 19 of the receptacle shell 18 can optionally be adhered or sewn to the sole board 16.

Figure 3:
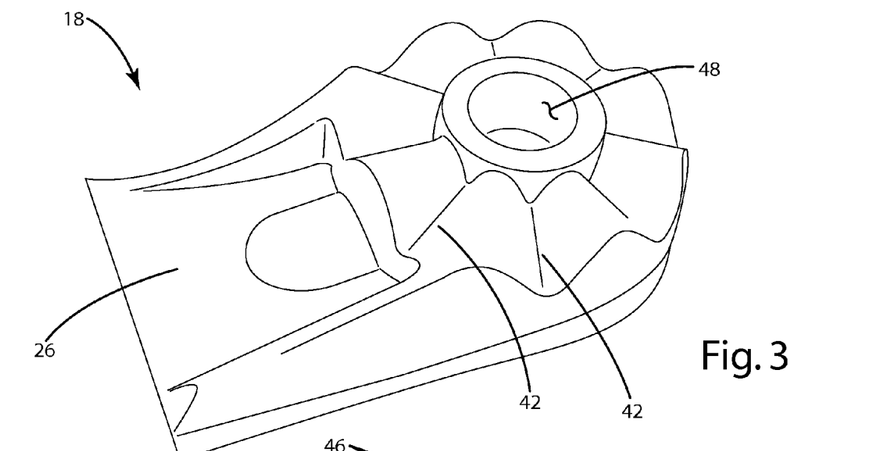
FIG. 3 is a bottom perspective view of a receptacle shell.
Figure 4:
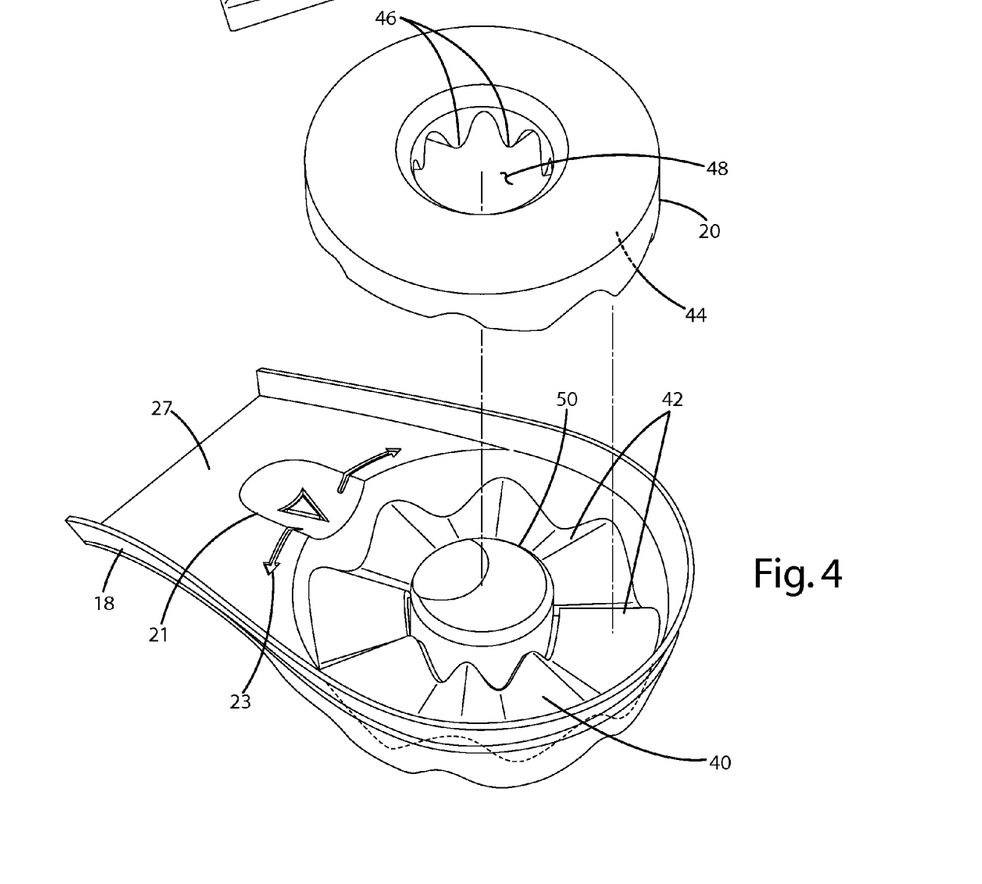
FIG. 4 is a perspective view of the receptacle shell and a cushion insert.

The receptacle shell 18 can be formed as a thin layer of a relatively hard material that is somewhat flexible under loads encountered during use, such as TPU or a harder EVA, and can have a generally uniform thickness across the length and width of the receptacle shell. The hardness of the receptacle shell 18 may vary from application to application as desired. For example, the receptacle shell 18 can have a durometer in the range of approximately 80-90 on the Asker A scale. In the illustrated embodiment, the receptacle 24 is formed as a cup-shaped cavity that extends below the top surface 40 of the shell 18. As shown in FIG. 3, the portion of the shell 18 is defining the cup-shaped cavity extends from the bottom surface 26 of the receptacle shell 18.

Figure 5:
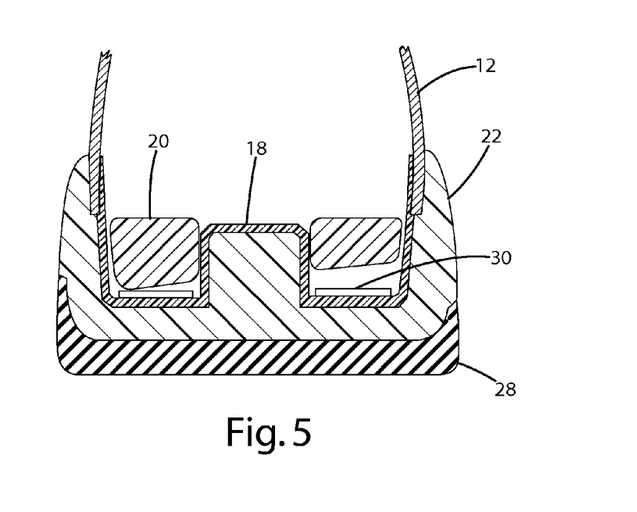
FIG. 5 is a sectional rear view of the footwear construction.

The receptacle 24 can be formed to receive a cushion insert 20 of any suitable size and shape. In the illustrated embodiment, an interface surface 40 on the receptacle 24 includes a plurality of projections or lobes 42, which correspond to a plurality of lobes 46 on an interface surface or bottom surface 44 of the cushion insert 20. The lobes 42 and 46 are adapted to be substantially interfitted when the cushion insert 20 is installed in the receptacle 24, although a gap may exist between a portion of the respective lobes 42 and 46 (FIG. 5). The lobes 42 on the receptacle 24 can be positioned around the interface surface 40 in a pattern of regular waves coinciding with angular sections of the receptacle 24. For example, in the illustrated embodiment, the receptacle 24 includes eight lobes 42 arranged in a regular repeating pattern about the center of the interface surface 40. Although the lobes 42 of the illustrated embodiment are formed by smooth and continuous curved contours, the term "lobes" is used broadly to refer to essentially any contours, whether or not such contours are curved, smooth or run continuously together. Optionally, the lobes 42 on the receptacle 24 and the lobes 46 on the cushion insert 20 can be of different shapes to provide different support/cushioning characteristics.

Although this embodiment shows a receptacle shell 18 having a single receptacle 24 in the heel region 38, a receptacle 24 and cushion insert 20 can alternatively be positioned in other regions of the article 10, such as in the forefoot portion 34 or other locations where the type of adjustability provided by this construction may be desirable. Alternatively, the receptacle shell 18 can define a plurality of receptacles 24 configured to receive a plurality of cushion inserts 20 positioned in more than one location on the article 10.

The cushion insert 20 can be shaped and sized to fit substantially within the receptacle 24. In the illustrated embodiment, the cushion insert 20 is generally disc-shaped and is configured to be seated within the generally round receptacle 24 (See FIGS. 1, 2 and 4). Optionally, the cushion insert 20 is configured to be removably fitted into the receptacle 24 in a variety of different orientations to provide differing cushioning characteristics. To differ the cushioning characteristics, one or more of the lobes 46 can vary in size, shape or other characteristics from the remainder of the lobes 46 so that repositioning of the cushion insert 20 results in repositioning of the lobes 46 and therefore causes changes to the support/cushioning characteristics of the article 10. Although the illustrated embodiment discloses differing lobes 46, adjustability may also be provided by varying essentially any characteristic of the cushion insert 20 or the lobes 46, such as size, shape, configuration and materials to provide the desired support/cushioning throughout the range of adjustability of the cushion insert 20. For example, the lobes may be manufactured from materials of different degrees of hardness. In an embodiment of this type, the cushion insert may be formed of lobes manufactured from different materials. Although the manufacturing process may vary, the different materials of the cushion insert may be cemented together, integrally molded using multiple shots or compression molded.

In the illustrated embodiment, the insert 20 defines a central hole 48 adapted to be fitted over a central post 50 formed by the receptacle shell 18. The central hole 48 and central post 50 may assist in aligning and/or retaining the insert 20 in the receptacle 24. The central hole 48 and central post 50 can optionally be configured to be snap-fitted together. Although not shown, the central post 50 may include a head (not shown) and the central hole 48 may define an enlarged space (not shown) to receive the head of the central post 50 when the cushion insert 20 is installed in the receptacle 24. As another example, the central post 50 and the central hole 48 may be shaped so that the insert 20 fits into the receptacle 24 only in select orientations.

Optionally, to assist a user in grasping the cushion insert 20 from the receptacle 24, the receptacle shell 18 and/or the post 50 can include an indentation 21 positioned at the periphery of the receptacle 24. The indentation 21 allows access to a side portion of the cushion insert 20, such that the cushion insert 20 can be more easily lifted from or rotated in the receptacle 24. The receptacle shell 18 can also optionally include markings 23, including but not limited to arrows, showing the user how the cushion insert can be adjusted.

Optionally, a support layer 30 can be included between the cushion insert 20 and the receptacle 24 (FIG. 2). The support layer 30 can be positioned over one or more of the lobes 42 or 46 to provide the lobes with the desired characteristics. For example, a firmer support layer (e.g., a relatively thin layer of TPU or other plastic material) may be provided over select lobes to provide enhanced firmness, while a thinner support layer (or the absence of a support layer) over select lobes may provide reduced firmness in select regions. Variations in the thickness of the support layer 30 may be used to provide the desired variations in lobe characteristics. The support layer 30 may be secured to the undersurface of the cushion insert 20 or the upper surface of the receptacle 24, if desired.

The direct attach sole component 22 can be a midsole or any other sole component that is adapted to be molded directly onto the receptacle shell 18 and sole board 16. The sole component 22 of the illustrated embodiment is a single unitary construction that extends from the heel portion 38, through the arch portion 36, to the forefoot portion 34. However, the sole component 22 can alternatively be a collection of separate components or may be a partial sole component configured to extend through only one or more select portions of the article 10.

The sole component 22 may be formed from essentially any moldable material or combination of materials capable of providing the desired cushioning/support characteristics. For example, the sole component 22 can be manufactured from polyurethane or EVA having the desired hardness/resiliency. The hardness of the sole component 22 may vary from application to application as desired.

The material from which the sole component 22 is constructed bonds directly to the lower portion 13 of the upper 12, to the bottom surface 26 of the receptacle shell 18, and to the bottom surface 52 of the sole board 16 and therefore forms a supporting surface that directly corresponds to the respective surfaces of the upper, receptacle shell and sole board. Immediately adjacent the upper 12, the sole component 22 can form a bead or a shoulder 54, which can be generally rounded and can circumferentiate the entire upper. As desired, the shoulder 54 can be interrupted to provide a desired appearance in certain regions of the footwear. Optionally, the direct attach sole component 22 can define windows or openings so that the cushion insert 20 and/or receptacle shell 18 are visible from outside of the article 18.

Figure 6:
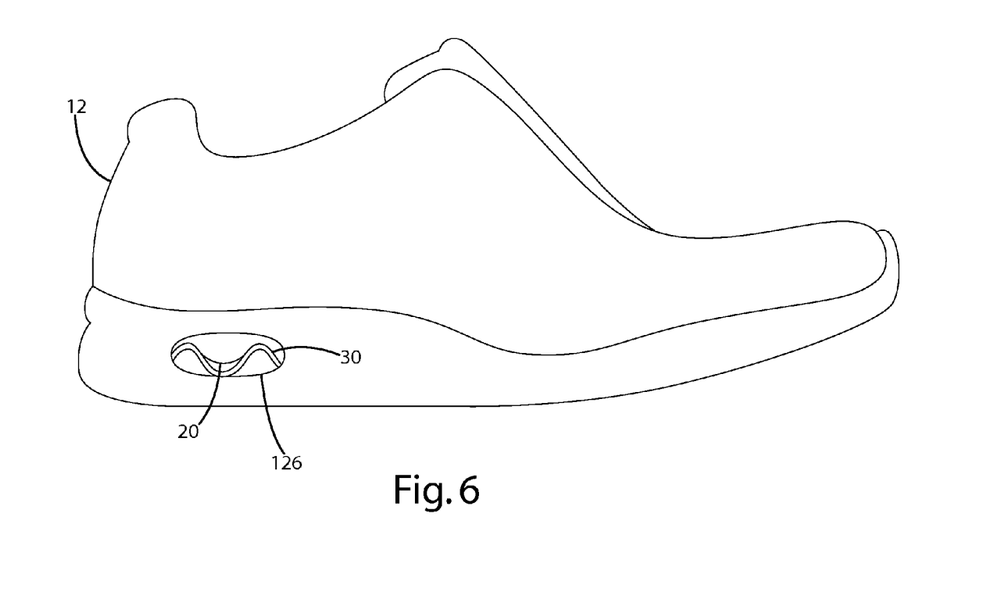
FIG. 6 is a side view of a footwear construction having a window showing an adjustable sole construction.

Optionally, a window or opening may be formed in the direct attach sole component 22, such that the cushion insert and/or the receptacle shell are visible through the window from outside of the article 10. For example, as shown in FIG. 6, both the cushion insert 20 and the support layer 30 are visible through the window 126, which is formed in a side wall or portion of the direct attach sole component 22.

The footwear article 10 can also include an outsole 28 that can be joined with the sole component 22. The outsole 28 is generally conventional and will not be described in detail. The outsole 28 can be manufactured from a relatively hard rubber or other sufficiently durable and wear-resistant material. The bottom or outer surface of the outsole 28 forms the wearing surface of the outsole 28 and can be contoured to the desired heel and tread pattern. The outer surface can be textured to improve the traction and aesthetic appeal of the shoe. Optionally, an upper surface of the outsole can be textured as well.

II. Manufacture and Assembly

Manufacture of the footwear article 10 will now be described with reference to FIG. 7B. The upper 12 can be manufactured using generally conventional techniques and apparatus. For example, the desired upper material can be cut to form the upper. Optionally, a liner can be secured within the upper via adhesives or stitching (not shown). The optional liner can be fitted to the upper so that in the finished footwear, it extends downward a sufficient distance so that the later-added sole component 22 terminates above the lowermost portion of the liner.

Figure 7A:
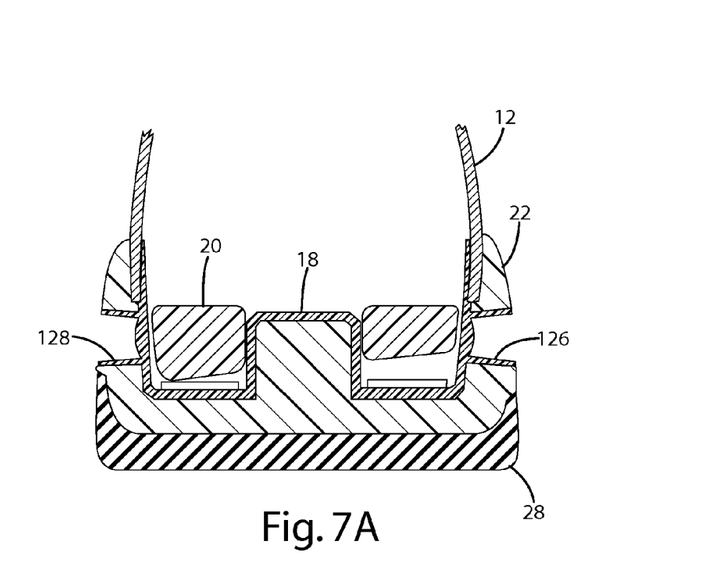
FIG. 7A is a sectional rear view of the footwear construction of FIG. 7.
Figure 7B:
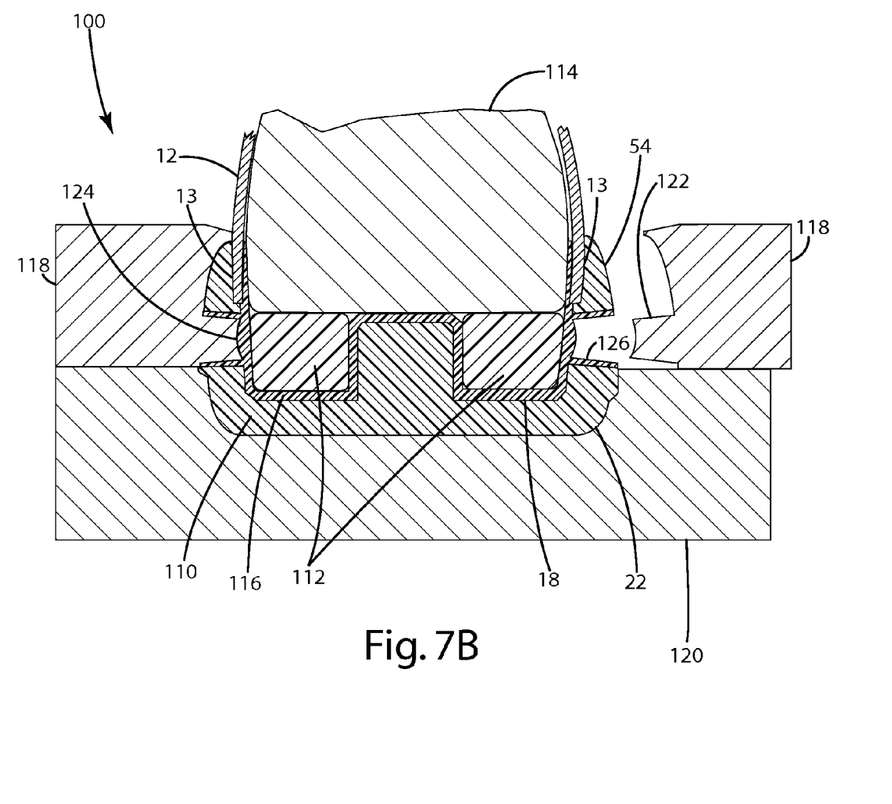
FIG. 7B is a sectional view of a mold used to form the footwear construction shown in FIG. 7A.

The upper 12 can be fitted on a conventional last 114 as shown in FIG. 7B. Optionally, to assist in securing the last 114 in place on the upper 12, a portion of the upper 12 can be temporarily tacked or stapled to the last 114. The lower portion 13 of the upper 12 can then be board-lasted with cement, adhesive or other attachment means to both the receptacle shell 18 in the heel region of the article 10 and to the sole board 16 in the forefoot and arch regions 34 and 36.

In one embodiment, prior to lasting the upper 12 to the receptacle shell 18, a molding insert 112 is inserted into the receptacle 24 of the receptacle shell 18 to prevent the receptacle shell 18 from becoming distorted during the molding process. For example, without the molding insert 112, the thin layer of material forming the receptacle 24 could be softened by the high temperature of the injected material and forced upward toward the upper 12. As shown in FIG. 7B, the molding insert 112 can be directly and completely interfitted with the receptacle 24, such that there are no voids or gaps or spaces between the insert 112 and the receptacle 24. In the illustrated embodiment, the insert 112 is adjusted so that the plurality of lobes 116 on the insert 112 are interfitted with the lobes 42 of the receptacle 24.

Optionally, the upper 12 can be fitted on two separate lasts. For example, in one embodiment, the upper 12 can be stretched over a first last and joined with the receptacle shell 18 and sole board 16. The first last can then be removed from the upper 12, receptacle shell 18 and sole board 16. The molding insert 112 can then be placed in the receptacle shell 18. A second, molding last could then be inserted between the upper 12 and the receptacle shell 18 and sole board 16.

The molding insert 112 maintains the shape and contour of the receptacle shell 18 during the molding process. As discussed above, the material used to form the molding insert 112 can be substantially harder than the material used to form the cushion insert 20. If the cushion insert 20 is formed from a relatively soft and flexible material adapted to provide cushioning characteristics, the cushion insert 20 is typically unsatisfactory for maintaining the shape and contour of the receptacle shell 18 during the molding process.

Figure 7C:
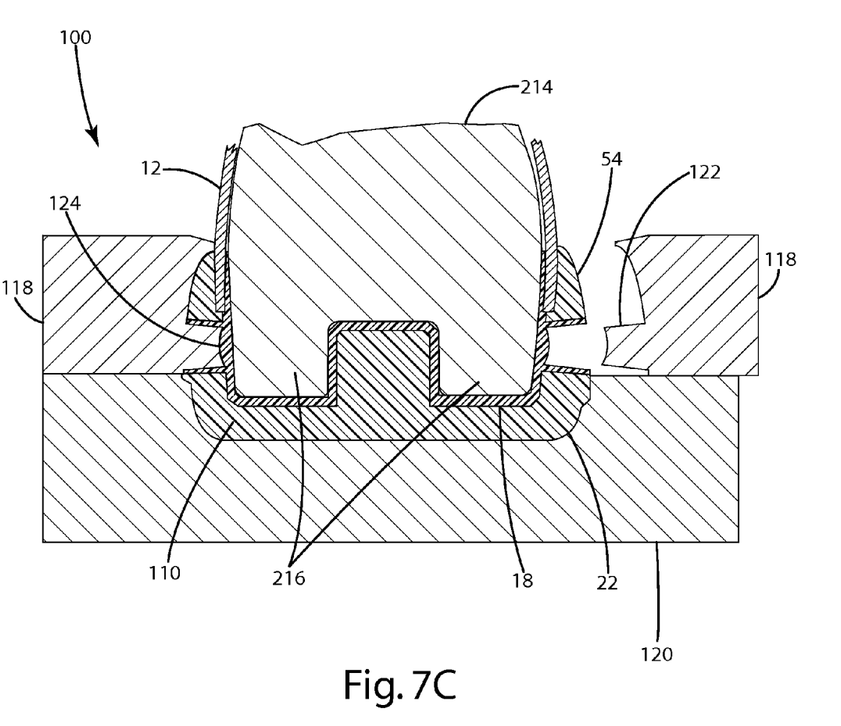
FIG. 7C is another sectional view of the mold, showing a last having a projection extending therefrom.

Alternatively, a last 214 can be used that includes at least one projection 216 extending from a bottom surface thereof, the projection 216 being adapted to be fitted within the receptacle 24 during the molding process (FIG. 7C). In this embodiment, the projection 216 on the last 214 eliminates any voids or gaps or spaces between the projection 216 and the receptacle 24 and maintains the shape of the receptacle 24 and receptacle shell 18 during molding. Thus, in this embodiment, the projection 216 on the last 114 performs the function of the mold insert 112 described above, such that a separate mold insert 112 is not required.

Once either the molding insert 112 or the projection 216 is placed in the receptacle 24, a lower portion 13 of the upper 12 can then be board lasted with cement, adhesive or other attachment means to the upper surface 27 of the receptacle shell 18. As shown in FIGS. 7B and 7C, the molding insert 112 (or the projection 216) faces the upper 12. Before or after lasting the upper 12 to the receptacle shell 18, the upper 12 can also be lasted to the upper surface 17 of the sole board 16. With the upper 12 lasted to the receptacle shell 18 and the sole board 16, these components are ready for a direct attach molding operation as illustrated in FIGS. 7B and 7C.

The board lasted upper 12, with the receptacle shell 18 and the sole board 16 attached, is lowered against the mold 100, which includes side molds 118 and bottom molds 120. Each side mold 118 wraps around the sides of the lasted upper 20, and the side molds 118 mate with one another at the front and rear of the article 10. In the illustrated embodiment, the upper 12, receptacle shell 18 and sole board 16 form an upper wall in the midsole cavity 110. The side molds 118 generally define the sidewalls in the cavity 110, and the bottom molds 120 form the bottom walls in the cavity 110. A lower portion 13 of the upper 12 is included in the mold cavity 110 and is positioned to be direct attached to the sole component 22.

With the cavity 110 properly formed by the components, the appropriate volume of material to form the sole component 22 is injected or poured into the cavity 110, such as through ports or the like. The mold 100 holds the upper 12 firmly enough to prevent material from exiting the mold 100 from the top of the cavity 110. The material introduced into the cavity substantially fills the cavity 110, so that the material direct attaches to the upper 12, the receptacle shell 18 and the sole board 16. As the material fills the midsole cavity, it forms the sole component 22. The sole component material is then allowed to sufficiently cure and direct attach to the upper 12, the receptacle shell 18 and the sole board 16.

Optionally, the side molds 118 or the bottom mold 120 can include protrusions or inserts 122 and 124 adapted to form windows 126 and 128 in the sole component 22. As shown in FIGS. 7B and 7C, the protrusions 122 and 124 extend into the mold cavity from the inner surface of each of the side molds 118. For purposes of illustration, one of the side molds 118 and protrusion 124 are shown in place in the mold cavity, while the opposite side mold 118 and protrusion 122 are shown after they have been separated from the mold cavity, leaving behind the window 126 in the sole component 22. The protrusions 122 and 124 are both adapted to engage an outside surface of the receptacle shell 18 during molding to prevent the material that forms the sole component 22 from engaging those portions of the receptacle shell 18. Once the material in the mold cavity 110 has cured to form the sole component 22, the side molds 118 and protrusions 122 and 124 are moved away from or out of the mold cavity, leaving behind the windows 126 and 128 in the sole component 22. Optionally, the receptacle shell 18 can be formed from a clear, transparent or translucent or otherwise "see-through" material, such that the cushion insert 20 will be visible or viewable through the windows 126 and 128 from outside of the article 10.

The last 114 can then be separated from the upper 12, receptacle shell 18 and sole component 22, leaving behind the article 10.

A number of other conventional finishing operations can then be performed on the shoe 10. For example, any excess flashing resulting from the direct attach process may be trimmed from the sole component 22. Additionally, the upper 12 can be cleaned, polished and treated as desired.

III. Transparent Shell Construction

Figures 8, 9:
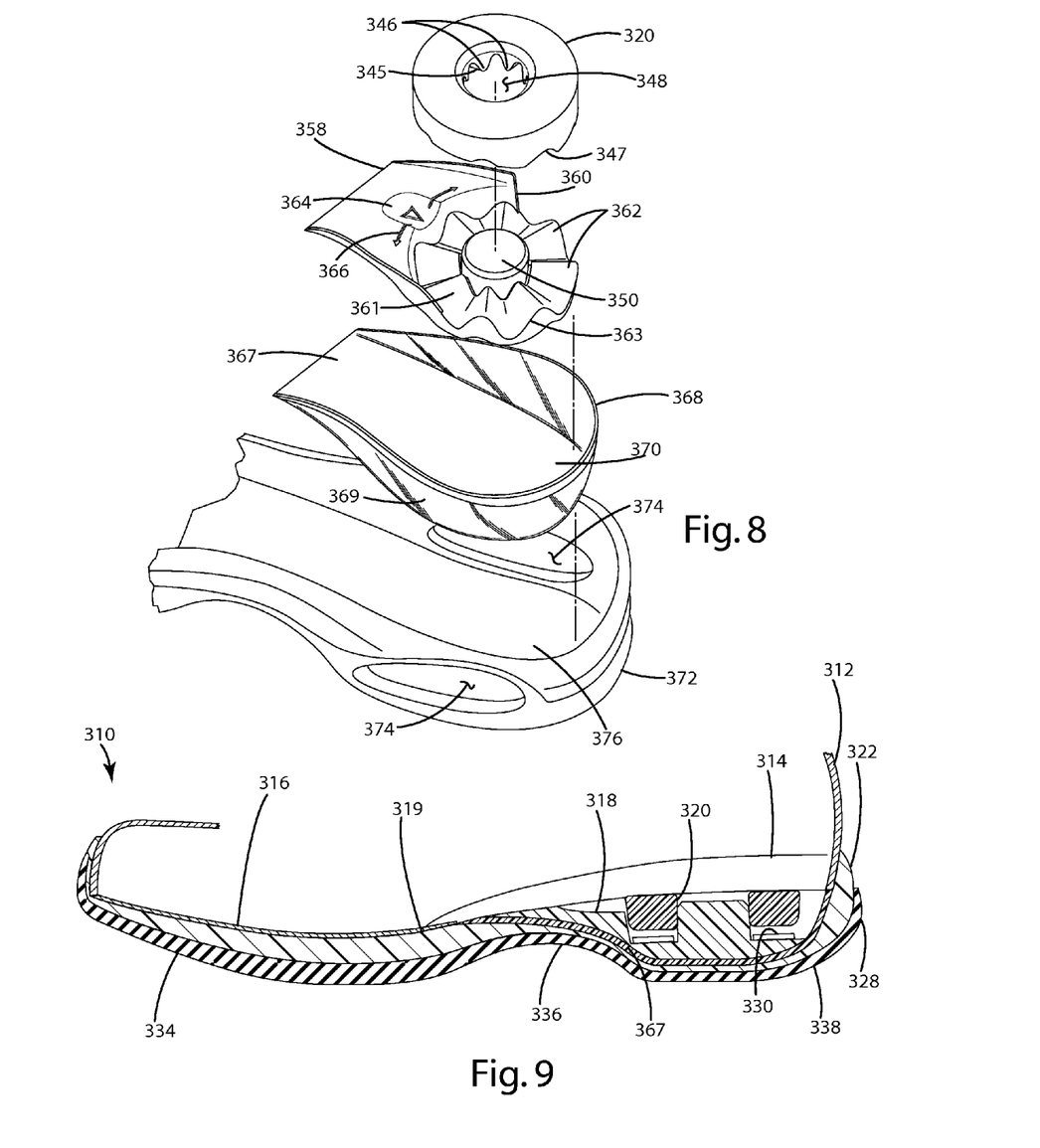
FIG. 8 is an exploded view of another footwear construction in accordance with the present invention.
FIG. 9 is a sectional side view of the footwear construction of FIG. 9.

According to another embodiment of the invention, a footwear construction or footwear article 310 includes a shell 367 having a transparent portion 369. As shown in FIGS. 8 and 9, the shell 367 is adapted to support or receive a sole component 358, which is adapted to support or receive an adjustable cushion insert 320. Both the sole component 358 and the cushion insert 320 have a contoured interface surface 361 and 345, respectively, each of which has a respective edge 363 and 347. Portions of at least one of the edges 347 and 363 of the respective interface surfaces are visible through the transparent portion 369 of the shell 367. In the illustrated embodiment, the footwear construction 310 also includes an outsole 372 molded onto at least a portion of the shell 367, such that portions of at least one of the edges 347 and 363 is viewable from the exterior of the footwear construction 310. An upper 312 is attached to at least one of the shell 367, the sole component 358 and the outsole 372.

The cushion insert 320 can be identical or substantially similar to the cushion insert 20 described above in detail with respect to footwear construction 10. The cushion insert 320 can be shaped and sized to fit over a portion of the sole component 358. In the illustrated embodiment, the cushion insert interface surface 345 includes a plurality of projections or lobes 346 extending therefrom. As discussed above with respect to cushion insert 20 and receptacle shell 18, the projections 346 can be aligned to at least partially interfit with corresponding lobes or projections 362 on the sole component interface surface 361.

Optionally, the cushion insert 320 is configured to be removably fitted over the sole component interface surface 361 in a variety of different orientations to provide differing cushioning characteristics. To differ the cushioning characteristics, one or more of the projections 346 can vary in size, shape or other characteristics from the remainder of the projections 346 so that repositioning of the cushion insert 320 results in repositioning of the projections 346 and, therefore, causes changes to the support/cushioning characteristics of the article 310.

The sole component 358 can be formed in any suitable shape and size, such that portions of at least one of the edges 347 and 363 is visible or viewable when the cushion insert 320 is in place over the sole component 358. This permits a user to visually determine the position of the insert without removing the article of footwear. In the illustrated embodiment, the sole component interface surface 361 is formed in an upper or top surface of the sole component 358 and is partially surrounded by a sidewall 360. The remaining edge portion of the sole component interface surface 361 is exposed, such that a portion of both the edge 347 of the cushion insert interface surface 345 and the edge 363 of the sole component interface surface 361 are visible when the cushion insert 320 is fitted over the sole component 358.

Optionally, to assist a user in grasping the cushion insert 320 from the interface surface 361 of the sole component 358, the sole component 358 can include an indentation 364 positioned at the periphery of the sole component interface surface 361. Like the indentation 21 discussed above with respect to footwear article 10, the indentation 364 can allow access to a side portion of the cushion insert 320, such that the cushion insert 320 can be more easily lifted from or rotated about the sole component 358. The sole component 358 can also optionally include markings 366, including but not limited to arrows, showing the user how the cushion insert can be adjusted.

To retain the cushion insert 320 on the sole component 358, the cushion insert can optionally define an aperture 348 adapted to be fitted over a post 350 on the sole component 358. The hole 348 and post 350 may assist in aligning and/or retaining the insert 320 over the sole component 358 and may be substantially similar or identical to the central hole 48 and central post 50 discussed above with respect to the footwear article 10.

The shell 367 can be formed in any suitable shape adapted to receive or support the sole component 358. In the illustrated embodiment, the shell 367 includes a floor 370 adapted to support a bottom surface of the sole component 358 and at least one sidewall 368 extending from the floor 370. The shell 367 and sole component 358 can optionally be sized so that the sole component 358 and cushion insert 320 fit substantially or completely within the shell 367. The shell 367 can include an open upper surface, such that the sole component 358 and cushion insert 320 can be accessed while the sole component 358 is positioned in the shell 367.

Any or all portions of the shell 367 can be transparent. In the illustrated embodiment, the sidewall portion 368 of the shell 367 is transparent. However, in other embodiments, select portions of the shell 367 that are viewable from the exterior of the footwear construction 310 may be transparent. As used herein, the term "transparent" can mean transparent, clear, translucent or "see-through." The transparent portion 369 can also optionally be tinted any desired color.

As shown in FIG. 9, when the sole component 358 is fitted into the shell 367, both the edge 347 of the cushion insert interface surface 345 and the edge 363 of the sole component interface surface 361 are aligned with the transparent sidewall 368 of the shell 367. Thus, in the illustrated embodiment, the exposed edges 347 and 363 are viewable through the shell 367.

The outsole 372 can be a generally conventional outsole and can be joined with at least one of the shell 367, the sole component 358 and the upper 312 in any suitable manner, such as by cement. The outsole 372 includes a generally flat upper surface 376 adapted to support a bottom surface of the shell 367. Optionally, the outsole 372 can be molded directly onto the shell 367. For example, the outsole 372 can be direct attached to the shell 367 in the manner that direct attach sole component 22 is attached to the receptacle shell 18, as described above with respect to footwear article 10.

The outsole 372 can be manufactured from a relatively hard rubber or other sufficiently durable and wear-resistant material. As discussed above with respect to outsole 28, the bottom or outer surface of the outsole 372 forms the wearing surface of the outsole 372 and can be contoured to the desired heel and tread pattern. The outer surface can be textured to improve the traction and aesthetic appeal of the shoe.

Optionally, the outsole 372 can define at least one window 374, such that the transparent portion 369 and at least a portion of the edge 347 of the cushion insert interface surface 345 and/or the edge 363 of the sole component interface surface 361 are viewable through the window. This embodiment may be substantially similar to the footwear article shown in FIG. 6, having a window 126. In the illustrated embodiment in FIG. 9, the transparent sidewall 368 of the shell 367 is adapted to be aligned with the window 374 in the outsole, such that portions of both of the edges 347 and 363 are viewable through the window 374 from the exterior of the footwear construction 310. As shown in FIG. 9, the outsole 372 can optionally define multiple windows, which can be located on opposite sides of the outsole. The windows 374 can alternatively or additionally be positioned on the rear or bottom or any other portion of the outsole. The location of the windows 374 can depend on the arrangement of the cushion insert 320 and sole component 358 in the shell 367.

Alternatively, to allow the transparent portion 369 and portions of the edges 347 and 363 to be viewed without a window 374 in the outsole, the peripheral edge of the outsole 372 can optionally be formed to angle downward along the shell 367 to reveal part of the transparent portion 369 of the shell 367 (not shown).

The upper 312 can be generally conventional and can be substantially similar or identical to the upper 12 described above with respect to footwear article 10.

The above description is that of the current embodiment of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property or privilege is claimed are defined as follows:

1. A method of manufacturing an article of footwear having a direct attach sole component, the method comprising:
   providing an upper and a molded receptacle shell having a first surface facing the upper and a second surface opposite the first surface, wherein the receptacle shell forms a receptacle recessed from the first surface including a plurality of repeating lobes extending upwardly therefrom, wherein the receptacle is adapted to receive an insert;
   arranging the upper about a last adapted to engage the first surface of the receptacle shell, wherein the last includes at least one projection adapted to interfit with the receptacle;
   placing the projection into the receptacle;
   joining the upper with the receptacle shell;
   closing a mold about the second surface of the receptacle shell and at least a portion of the upper to form a mold cavity corresponding to the direct attach sole component;
   introducing a material into the mold cavity to form the direct attach sole component, wherein the material directly attaches to the second surface of the receptacle shell and the upper, wherein the projection maintains the shape of the receptacle shell and prevents the receptacle shell from becoming distorted within the mold cavity;
   separating the mold and the last from the upper, the receptacle shell and the direct attach sole component; and
   inserting a cushion insert into the receptacle in one of a plurality of orientations, wherein the cushion insert provides a cushioning characteristic based on the orientation of the cushion within the receptacle.

2. The method of claim 1 wherein placing the projection into the receptacle includes eliminating voids between the projection and the receptacle, wherein the molding insert is adapted to maintain the shape of the receptacle through the introducing step.

3. The method of claim 2 wherein the projection includes a plurality of lobes extending therefrom, wherein placing the projection into the receptacle includes interfitting the lobes on the projection with the lobes on the receptacle.

4. The method of claim 3 wherein the footwear article includes a forefoot portion, an arch portion and a heel portion, wherein the method comprises positioning the receptacle shell in a heel portion of the article and positioning a sole board in the forefoot and arch portions of the article.

5. The method of claim 4 wherein the closing a mold step includes closing the mold about at least a portion of the upper, the second surface of the receptacle shell and the sole board, wherein the material attaches directly to the upper, the second surface of the receptacle shell and the sole board.

6. The method of claim 5 wherein the mold includes at least one protrusion adapted to form a window in the direct attach sole component, wherein the method comprises engaging the receptacle shell with the protrusion before the introducing step.

* * * * *